US009134143B2

(12) United States Patent
Shibata

(10) Patent No.: US 9,134,143 B2
(45) Date of Patent: Sep. 15, 2015

(54) ABSOLUTE POSITION DETECTOR WITH ABNORMALITY DETECTION FUNCTION

(75) Inventor: Shinji Shibata, Aichi (JP)

(73) Assignee: OKUMA Corporation, Aichi (JP)

( * ) Notice: Subject to any disclaimer, the term of this patent is extended or adjusted under 35 U.S.C. 154(b) by 621 days.

(21) Appl. No.: 13/528,326

(22) Filed: Jun. 20, 2012

(65) Prior Publication Data

US 2013/0013250 A1 Jan. 10, 2013

(30) Foreign Application Priority Data

Jul. 8, 2011 (JP) .................................. 2011-152084

(51) Int. Cl.
*G01D 5/244* (2006.01)

(52) U.S. Cl.
CPC .................................. *G01D 5/24466* (2013.01)

(58) Field of Classification Search
CPC .................................. G01D 5/24466
USPC .......................................................... 702/150
See application file for complete search history.

(56) References Cited

U.S. PATENT DOCUMENTS

| 5,650,779 A | 7/1997 | Sugden | |
|---|---|---|---|
| 6,424,928 B1 * | 7/2002 | Elliott et al. | 702/151 |
| 2011/0202308 A1 * | 8/2011 | Kishida et al. | 702/151 |

FOREIGN PATENT DOCUMENTS

| JP | H04-279817 A | 10/1992 |
|---|---|---|
| JP | H04-297817 A | 10/1992 |
| JP | H05-17570 U | 3/1993 |
| JP | H06-123605 A | 5/1994 |
| JP | H07-167946 A | 7/1995 |
| JP | H07-209420 A | 8/1995 |
| JP | H09-89589 A | 4/1997 |
| JP | H11-270398 A | 10/1999 |
| JP | 2003035566 A | 2/2003 |
| JP | 2003-083768 A | 3/2003 |
| JP | 2005-055289 A | 3/2005 |
| JP | 2005-147733 A | 6/2005 |
| JP | 2009-085852 A | 4/2009 |
| JP | 2010-286371 A | 12/2010 |

OTHER PUBLICATIONS espacenet, Patent Abstract for Japanese Publication No. 2003-35566 Published Feb. 7, 2003 (1 page).
Office Action issued in counterpart U.S. Appl. No. 2011-152084 dated Dec. 16, 2014 (10 pages).
Notice of Grounds for Rejection issued in corresponding Japanese Application No. 2011-152084, mailed on Jun. 23, 2015 (9 pages).

* cited by examiner

*Primary Examiner* — Bryan Bui
(74) *Attorney, Agent, or Firm* — Osha Liang LLP

(57) ABSTRACT

In an absolute position detector, a relative error calculation circuit calculates, at times indicated by a clock signal C1, a relative error E between an output θ2 from an absolute position detection sensor and a position output θ1 from a high-resolution position detection sensor. An abnormality judgment unit judges whether the relative error E exceeds a preset abnormality judgment value. A clock switching unit outputs, as the clock signal, a high-speed clock CH having a period shorter than a noise generation period when the relative error E is judged as exceeding the preset abnormality judgment value, and outputs a slow-speed clock CL in other cases. A counter measures, based on the clock signal C1, a duration in which the abnormality detection signal AF is maintained HI, and outputs an alarm when the duration exceeds the noise generation period.

1 Claim, 5 Drawing Sheets

ABSOLUTE POSITION DETECTOR WITH ABNORMALITY DETECTION FUNCTION

PRIORITY INFORMATION

This application claims priority to Japanese Patent Application No. 2011-152084, filed on Jul. 8, 2011, which is incorporated herein by reference in its entirety.

FIELD OF THE INVENTION

The present invention relates to an absolute position detector used for applications such as control of a feed shaft of a machine tool, and more particularly to an absolute position detector with an abnormality detection function.

BACKGROUND

Conventionally, absolute position detectors used for applications such as control of a feed shaft of a machine tool have been known (for example, JP 2003-35566 A). Such an absolute position detector includes an absolute position detection sensor for detecting the absolute position of the shaft, and a high-resolution detection sensor for detecting the position at a resolution higher than that of the absolute position detection sensor. Based on output values obtained from these two types of sensors, a high-resolution absolute position is calculated.

It has been known that due to temperature drift and temperature characteristics of an interpolation circuit constituted with analog components, an angular error component that varies periodically is generated between the output value from the absolute position detection sensor and the output value from the high-resolution detection sensor. Conventionally, this angular error component was determined as a relative error, and when this relative error is excessively large, it was judged that an abnormality is generated.

FIG. 4 is a block diagram showing a conventional absolute position detector provided with such an abnormality detection function. FIG. 5 is a timing chart showing a case in which the abnormality detection process is performed.

A high-resolution position detection sensor 2 is a 4× resolver, and an absolute position detection sensor 3 is a 1× resolver. These sensors 2, 3 constitute a rotary position detector, and are mechanically coupled to a motor (not shown) via a shaft 1. In the absolute position detection sensor 3 which is a 1× resolver, every time the shaft 1 makes one full rotation, the phase of the detection signal is modulated 360°. On the other hand, in the high-resolution position detection sensor 2 which is a 4× resolver, every time the shaft 1 makes a ¼ rotation, the phase of the detection signal is modulated 360°. An interpolation circuit 4 transmits a magnetization signal to the absolute position detection sensor 3 in synchronization with a synchronization signal CL, to thereby perform interpolation with respect to the two-phase signal modulated in accordance with the position and to output an angle $\theta2$ expressed in 8 bits. The synchronization signal CL is a signal obtained by dividing, into ¼, a synchronization signal CH supplied from a transmitter 7 using a ¼ frequency divider 8. Further, in synchronization with the synchronization signal CH from the transmitter 7, an interpolation circuit 5 similarly performs interpolation with respect to the signal from the high-resolution position detection sensor 2, so as to output an angle $\theta1$ expressed in 8 bits.

In general, the high-resolution angle $\theta1$ is aligned in places of digits with a counter circuit (not shown), then sampled at a high speed to be converted into a position detection value expressing a single-rotation absolute value, and then transmitted to a control device. The absolute-value detection angle $\theta2$ is used for generating an initial value of the counter circuit at the time of turning ON the power. During normal operation, this angle $\theta2$ is sampled at a low speed for use in abnormality detection.

An abnormality detection method is next explained. A relative error calculation circuit 6 calculates a relative error E from the angles $\theta1$ and $\theta2$ using the following formulas 1 and 2.

$$X = (\theta2 \cdot 4 - \theta1)/2^8 \quad (1)$$

$$E = |X - \text{INT}(X) - 0.5| \quad (2)$$

Here, INT( ) denotes a function that returns a maximum integer that does not exceed the numerical value inside the parentheses. For example, INT(1.9)=1 and INT(−1.9)=−2 hold true. An abnormality judgment unit 9 outputs an abnormality detection signal AF when the relative error E exceeds an abnormality judgment reference value. The abnormality judgment reference value is a preset value, and may be set to 0.3 or the like, for example.

An absolute position detector configured as described above is integrated into a motor and coupled to a ball screw of a feed shaft of a machining tool via a coupling. In recent years, machine tools have been further downsized, such that the spindle power line of a machine tool is often arranged in the vicinity of the feed shaft motor. This spindle power line is known to cause electromagnetic waves due to large inverter switching noise generated when performing regenerative operations at times of spindle deceleration.

Next it will be explained how this noise causes errors in a position detector. In FIG. 3, the dashed line shows the relative error E when there is no noise. As the above-described noise generally occurs intermittently at a high frequency, as shown in FIG. 3, when the noise overlaps the instances of sampling of the sensor signals of the position detector (i.e., the times shown by the vertical lines in the graph showing the relative error E), the error is increased to form a random waveform as shown by solid lines.

When electromagnetic waves interfere with the resolvers inside the absolute position detector integrated in the feed shaft motor, the position detection values become unstable and errors are generated. As a result, the value of the relative error E may exceed the abnormality judgment reference value, such that the abnormality detection signal AF may be output. Since an abnormality caused in this manner is not an intended object of abnormality detection, this should actually be ignored. However, in conventional devices, as it was impossible to distinguish whether the relative error E exceeded the reference value due to the switching noise or due to an actual abnormality, an alarm was output in either case.

Further, as shown in FIG. 3, the period for detecting the relative error E is generally longer than the switching period of the inverter, and may undesirably correspond to an integer multiple of the switching period. The switching noise could thus occur in synchronization with the instances of detection of the relative error, resulting in constant presence of the influence of the noise. In such cases, the probability of the relative error exceeding the abnormality judgment reference value becomes high.

Although it may be possible to overcome the above problems by designing and assembling the absolute position detector so that the accuracy of the respective resolvers are improved and the relative error becomes reduced, in that case, the problem of increase in the manufacturing cost of the absolute position detector becomes unavoidable.

In light of the above situation, the present invention is directed to providing an absolute position detector configured to detect abnormalities at a higher accuracy.

SUMMARY

According to one aspect of the present invention, there is provided an absolute position detector in which an output θ2 from an absolute position detection sensor and an output θ1 from a high-resolution position detection sensor having a higher resolution compared to the absolute position detection sensor are combined to obtain a high-resolution absolute position having the resolution of the high-resolution position detection sensor. The absolute position detector has a function of detecting an abnormality based on a relative error amount E between the two position outputs θ1 and θ2. The absolute position detector includes: a relative error calculation circuit that calculates, at times indicated by a clock signal, the relative error E between the output θ2 from the absolute position detection sensor and the position output θ1 from the high-resolution position detection sensor; an abnormality judgment unit that judges whether or not the relative error E exceeds a preset abnormality judgment value, and outputs an abnormality detection signal that is set to HI when the relative error E is judged as exceeding, and outputs a LOW abnormality detection signal in other cases; a clock switching unit that outputs, as the clock signal, a high-speed clock having a period shorter than a noise generation period when the abnormality detection signal is HI, and outputs a slow-speed clock when the abnormality detection signal is LOW; and a counter that measures, based on the clock signal, a duration for which the abnormality detection signal is maintained HI, and outputs an alarm when the duration exceeds the noise generation period.

According to the absolute position detector of the present invention, when the relative error E exceeds the abnormality judgment reference value, position detection and relative error calculation are performed at periods shorter than the noise generation period, and an abnormality is determined only when an abnormal state continues for longer than the noise generation period. With this arrangement, because position detection and abnormality judgment are performed at instances in which there is no noise, the condition related to the duration of abnormal state is not satisfied, such that the noise does not cause determination of abnormality. Further, as the duration of a regenerative operation is short, the intended abnormality detection can also be accomplished. Moreover, as the clock signal is switched to the high-speed clock only when the relative error E exceeds the abnormality judgment reference value, power consumption for abnormality detection is minimized.

DETAILED DESCRIPTION

Figure 1:
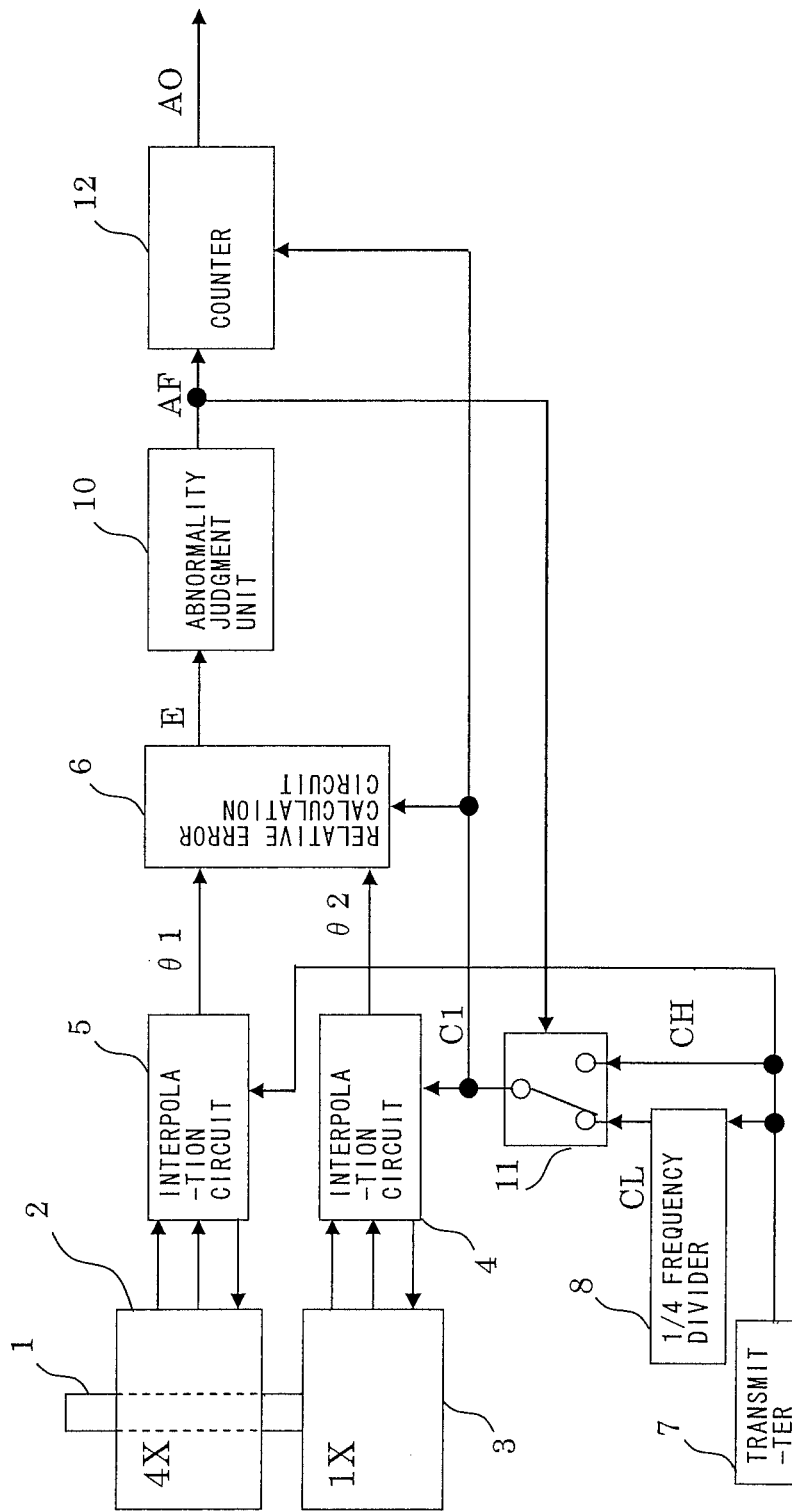
FIG. 1 is a block diagram showing a configuration of an absolute position detector according to an embodiment of the present invention.
Figure 3:
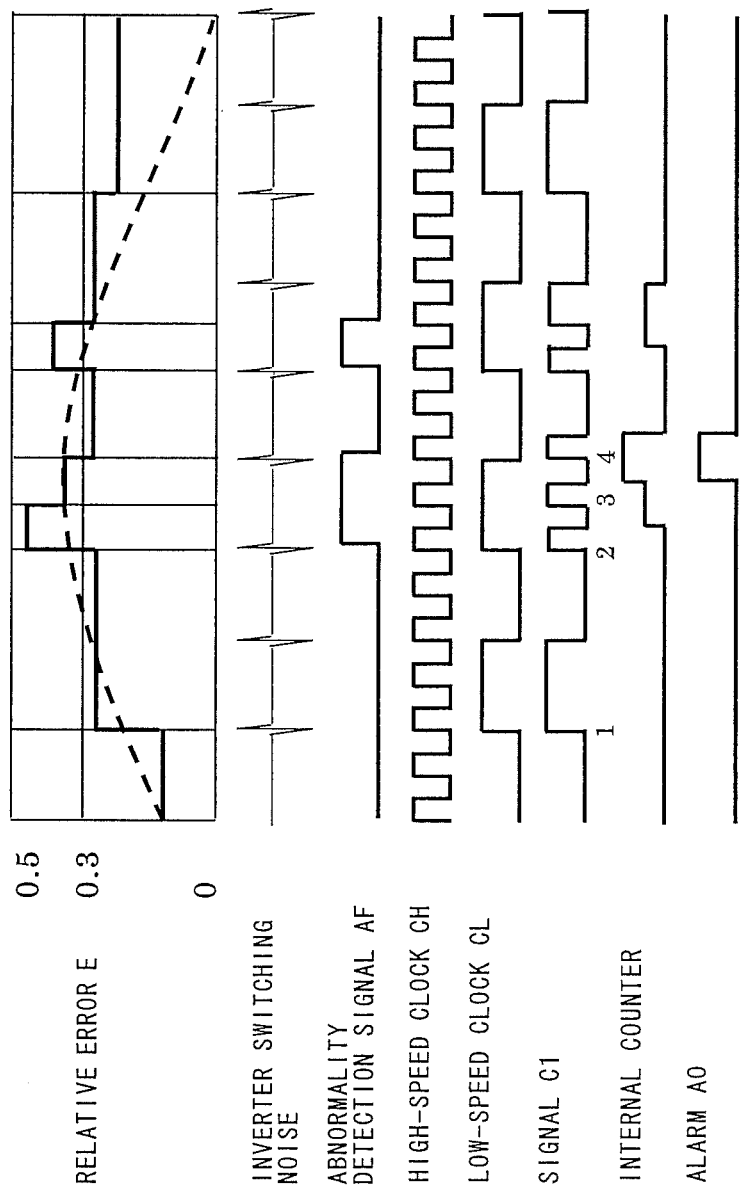
FIG. 3 is an example timing chart of abnormality detection in a case in which abnormality is generated.
Figure 4:
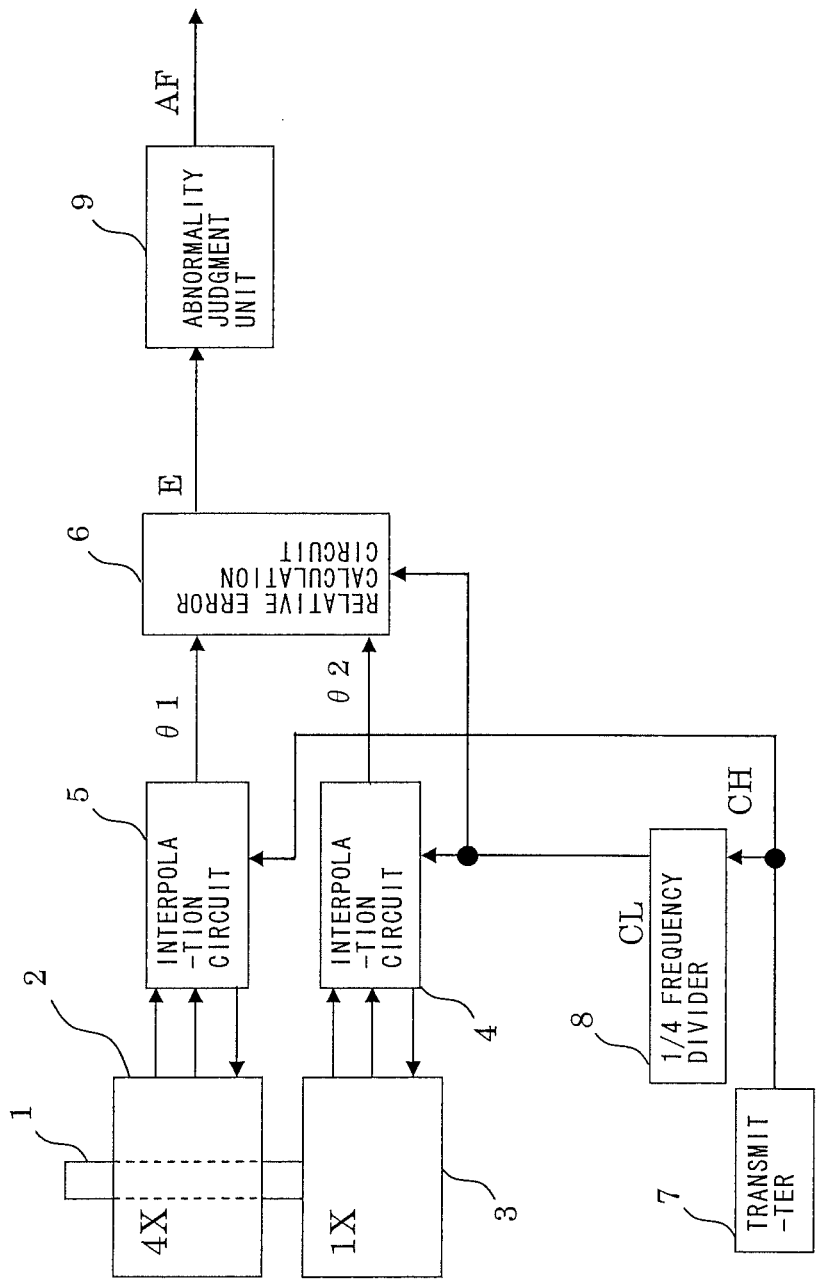
FIG. 4 is a block diagram showing a configuration of a conventional absolute position detector.
Figure 5:
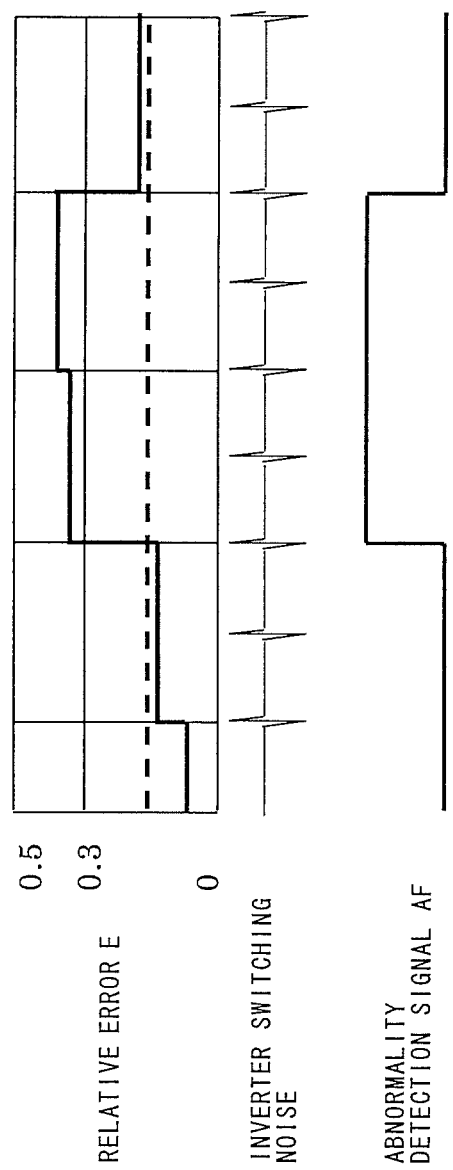
FIG. 5 is an example timing chart of abnormality detection in a conventional device.

An embodiment of the present invention is described below referring to the drawings. FIG. 1 is a block diagram showing a configuration of an absolute position detector according to an embodiment of the present invention. In FIG. 1, the functions of elements 1-10 are identical to those of elements 1-10 in the conventional absolute position detector shown in FIG. 4. Further, FIGS. 2 and 3 are timing charts of an abnormality detection performed in the detector of the present embodiment.

When the abnormality detection signal AF is set to HI (high level), a clock switching unit 11 outputs a high-speed clock CH having a period shorter than the switching period of the inverter controlling the motor. On the other hand, when the abnormality detection signal AF is set to LOW (low level), the clock switching unit 11 outputs a low-speed clock CL. A counter 12 counts signal C1 during the time when the abnormality detection signal AF is HI, to thereby measure the duration in which the abnormality detection signal AF is maintained HI. The counter 12 outputs an alarm signal AO when the duration of the abnormality detection signal AF exceeds the switching period.

Figure 2:
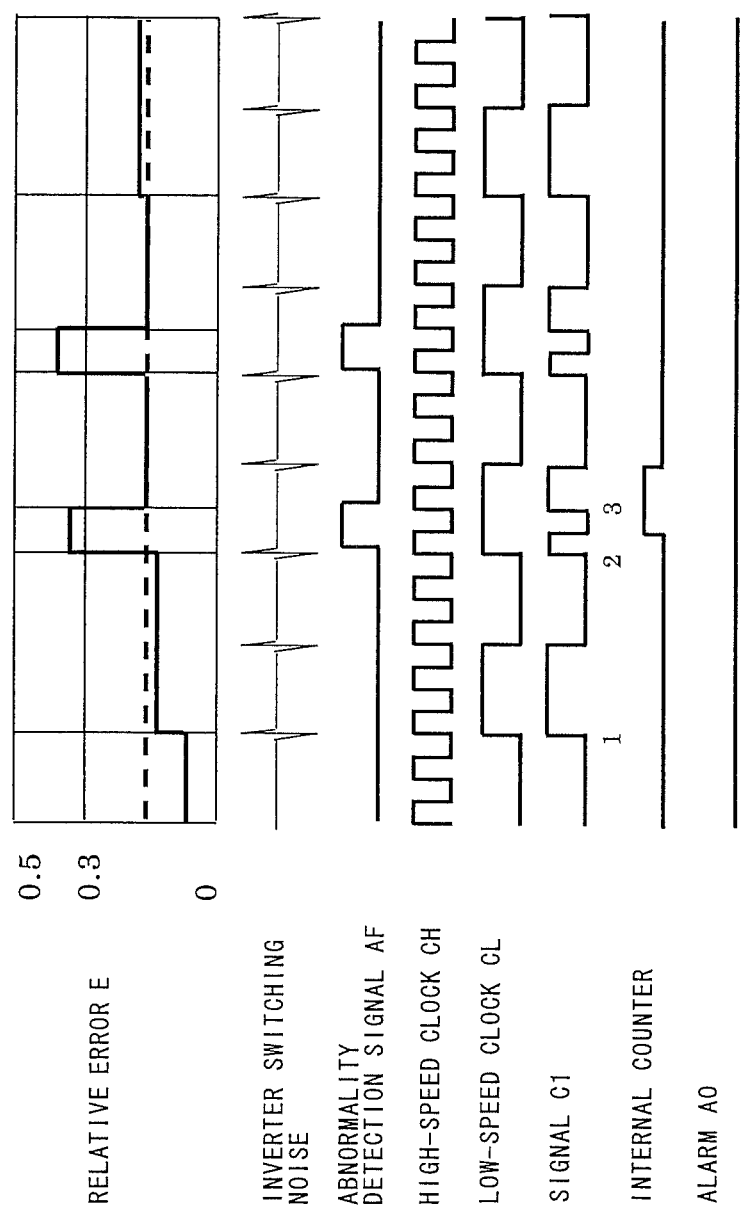
FIG. 2 is an example timing chart of abnormality detection in a case in which no abnormality is generated.

Now referring to FIG. 2, a flow of abnormality detection is explained for a case in which the relative error E value is normal and noise is overlapped. The dashed line in FIG. 2 shows the relative error E when there is no noise. When the abnormality detection signal AF is LOW, the low-speed clock CL is output as signal C1. The relative error calculation circuit 6 samples sensor signals at the rising edge of this signal C1 and calculates the relative error E. Here, if noise is synchronized with the rising edge of signal C1, the relative error E would be shifted from the dashed line (i.e., the actual relative error E value) by the amount of the noise. In FIG. 2, at the first rising edge of signal C1, the relative error E remains below the abnormality judgment reference value of 0.3, so that the abnormality detection signal AF remains LOW. At the second rising edge of signal C1, with noise being overlapped, the relative error E exceeds 0.3. At this point, the abnormality detection signal AF becomes HI. When the abnormality detection signal AF is switched to HI, signal C1 is changed to the high-speed clock CH having a period shorter than the switching period. Further, as the abnormality detection signal AF is HI, the counter 12 counts up at the second falling edge of signal C1. As a result, the internal counter value is changed from "0" to "1".

Next, the third rising edge of signal C1 occurs in a period shorter than the switching period. Accordingly, no noise is present at the third rising edge of signal C1, such that the relative error E value at this point equals the level of the dashed line (i.e., the actual relative error E value) and is thus below the abnormality judgment reference value of 0.3. Therefore, the abnormality detection signal AF becomes LOW, and signal C1 is switched to the low-speed clock CL. As the abnormality detection signal AF is LOW, the counter 12 clears its count at the third falling edge of C1, so that the internal counter value becomes "0".

Now referring to FIG. 3, a flow of abnormality detection is explained for a case in which the relative error E value is abnormal and noise is overlapped. The dashed line in FIG. 3 shows the relative error E when there is no noise.

As the operations at the first and second rising edges of signal C1 are the same as those in FIG. 2, explanations thereof will not be repeated. At the third rising edge of signal C1, since no noise is present, the relative error E value at this point equals the level of the dashed line (i.e., the actual relative error E value). In this example, as the actual relative error E is above the abnormality judgment reference value of 0.3, the sampled relative error E is also above the abnormality judgment reference value of 0.3. As a result, the abnormality detection signal AF is maintained HI, and also the high-speed clock CH is maintained as signal C1. Because the abnormality detection signal AF is HI, the counter 12 counts up at the third falling edge of signal C1, such that the internal counter value is changed from "1" to "2". When this counter value becomes "2", the counter 12 sets the alarm signal AO to HI.

In this way, only when the relative error E exceeds the abnormality judgment reference value, the sampling period of the relative error E is changed to a period that does not receive influence of the noise. By checking the relative error E value after the change, abnormality detection can be performed without being influenced by the noise.

While the above description refers to an example case in which the source generating the noise is the spindle power line, the present invention can achieve similar effects in relation to other noises such as the noise generated at the time of discharge in an electric discharge machine. Furthermore, while the above description refers to an example case in which resolvers serve as the position detection sensors, the present invention is not limited to use of resolvers, and similar effects can also be achieved by using other sensors such as optical encoders.

What is claimed is:

1. An absolute position detector in which an output $\theta 2$ from an absolute position detection sensor and an output $\theta 1$ from a high-resolution position detection sensor, having a higher resolution compared to the absolute position detection sensor, are combined to obtain a high-resolution absolute position having the resolution of the high-resolution position detection sensor, the absolute position detector having a function of detecting an abnormality based on a relative error amount E between the two position outputs $\theta 1$ and $\theta 2$, the absolute position detector comprising:

a relative error calculation circuit that calculates, at times indicated by a clock signal, the relative error E between the output $\theta 2$ from the absolute position detection sensor and the position output $\theta 1$ from the high-resolution position detection sensor;

an abnormality judgment unit that judges whether or not the relative error E exceeds a preset abnormality judgment value, and outputs an abnormality detection signal that is set to HI when the relative error E is judged as exceeding the preset abnormality judgment value, and outputs a LOW abnormality detection signal in other cases;

a clock switching unit that outputs, as the clock signal, a high-speed clock having a period shorter than a noise generation period when the abnormality detection signal is HI, and outputs a slow-speed clock when the abnormality detection signal is LOW; and a counter that measures, based on the clock signal, a duration in which the abnormality detection signal is maintained HI, and outputs an alarm when the duration exceeds the noise generation period.

* * * * *